US006842897B1

(12) United States Patent
Beadle et al.

(10) Patent No.: US 6,842,897 B1
(45) Date of Patent: *Jan. 11, 2005

(54) METHOD AND APPARATUS FOR SELECTING CLASSES USING A BROWSER FOR USE BY A VIRTUAL MACHINE IN A DATA PROCESSING SYSTEM

(75) Inventors: Bruce Anthony Beadle, Round Rock, TX (US); Michael Wayne Brown, Georgetown, TX (US); Kelvin Roderick Lawrence, Round Rock, TX (US); Douglas Scott Rothert, Austin, TX (US); Robert Michael Russin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/127,336

(22) Filed: Jul. 31, 1998

(51) Int. Cl.[7] ................................................. G06F 9/00
(52) U.S. Cl. ......................... 718/1; 717/121; 717/148
(58) Field of Search ............................ 718/1; 717/121, 717/148, 105, 170; 345/700; 709/220, 221, 222, 1

(56) References Cited

U.S. PATENT DOCUMENTS

| | | | | |
|---|---|---|---|---|
| 5,734,831 A | * | 3/1998 | Sanders | 709/223 |
| 6,205,476 B1 | * | 3/2001 | Hayes, Jr. | 709/220 |
| 6,263,377 B1 | * | 7/2001 | Monday et al. | 709/320 |
| 6,332,218 B1 | * | 12/2001 | Walker et al. | 717/166 |
| 6,339,829 B1 | * | 1/2002 | Beadle et al. | 713/201 |
| 6,433,794 B1 | * | 8/2002 | Beadle et al. | 345/700 |

OTHER PUBLICATIONS

"Java Native Interface Specification," May 1997, JavaSoft, Release 1.1, p. 75–82.*

Michael Edwards, "More Sniffing for Browsers, Virtual Machines, and Operating Systems," Jun. 1998, p. 1–4, obtained from website: http://msdn.microsoft.com/library/default.asp?url=/library/en–us/dndetect/html/sniffing.asp.*

* cited by examiner

*Primary Examiner*—Meng-Al T. An
*Assistant Examiner*—Li Zhen
(74) *Attorney, Agent, or Firm*—Duke W. Yee; Jeffrey S. LaBaw; Wayne P. Bailey

(57) ABSTRACT

A method for selecting classes using a browser for use by a virtual machine in a data processing system. The browser provides an interface in which the interface allows for selection of classes for use by the virtual machine. A selection of classes is received through the interface. The selection of classes is stored by the browser, wherein the selection of classes is used by the browser when initializing the virtual machine.

20 Claims, 5 Drawing Sheets

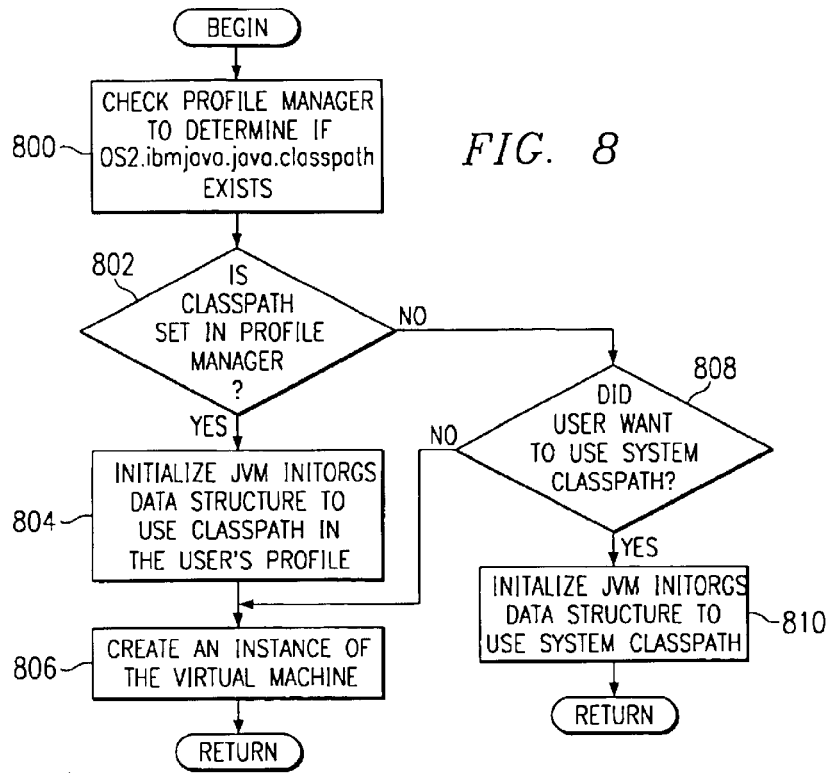

FIG. 8

JVM Initialization Data Structure
JDK1_1InitsArgs Fields

| Field Name | Java Flag | Description |
|---|---|---|
| nativeStackSize | -ss | Max Stack Size for native threads |
| javaStackSize | -oss | Max Stack for any JVM thread |
| minHeapSize | -ms | Initial heap size |
| maxHeapSize | -mx | Maximum heap size |
| verifyMode=0 | -noverify | Do not verify byte code when loading |
| verifyMode=1 | -verifyremote | verify byte code only when loading remotely |
| verifyMode=2 | -verify | verify loading of all byte code |
| classpath | -classpath | Local directories for loading classes |
| enableClassGC | -noclassgc | Enable/disable class garbage collection |
| enableVerboseGC | -verbosegc | Enable reporting of garbage collection |
| disableAsyncGC | -noasyncgc | Disable asynchronous garbage collection |
| verbose | -verbose of -v | Reports JVM information, including all class loads |
| debugging | -debug | Allow remote debugging of JVM |

FIG. 9

METHOD AND APPARATUS FOR SELECTING CLASSES USING A BROWSER FOR USE BY A VIRTUAL MACHINE IN A DATA PROCESSING SYSTEM

CROSS-REFERENCE TO RELATED APPLICATION

The present invention is related to the following applications entitled "Method and Apparatus to Selectively Define Java Virtual Machine Initializing Properties Using a Browser Graphical User Interface", U.S. Ser. No. 09/127,337, filed even date hereof, assigned to a common assignee, and "Method and Apparatus for Selecting a Java Virtual Machine For Use With a Browser", U.S. Ser. No. 09/127,339 (which issued as U.S. Pat. No. 6,433,794 on Aug. 13, 2002), filed even date hereof, assigned to a common assignee which are incorporated herein by reference.

BACKGROUND OF THE INVENTION

1. Technical Field

The present invention provides an improved data processing system and in particular an improved method and apparatus for selecting properties for a JVM. Still more particularly, the present invention provides a method and apparatus for selecting classes for a JVM used with a browser.

2. Description of Related Art

Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser.

When a user desires to retrieve a page, a request is submitted to a server connected to a client computer at which the user is located and may be handled by a series of servers to effect retrieval of the requested information. The information is provided to the client formatted according to HTML. Typically, personal computers (PCs) along with work stations are typically used to access the Internet.

Often applications or programs may be sent to a computer from a web server across the Internet. Java applications are becoming increasingly more prevalent as the type of application sent between web servers and client computers. Java applications are common on the Internet and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code.

Presently available browsers are designed with a notion of a fixed JVM, which uses a fixed value for the Java classpath. No flexible mechanisms are presently available for modifying or viewing the classpath within a browser. The problem with this approach is that of the global nature of the changing system classpath requires the user to modify the system defined global classpath variable manually or via a script which is executed prior to executing the browser. This system classpath variable is shared with other non-Java browser related applets or applications in addition to the Java enabled browser. Another problem exists for browsers that provide for a multi-user environment in which multiple users/user profiles are being employed. In such a situation, each user profile is forced to use the same environment.

Therefore, it would be advantageous to have an improved method and apparatus for providing users an ability to use more recent versions of JVMs without having to wait for an updated version of the web browser.

SUMMARY OF THE INVENTION

The present invention provides a method for selecting classes using a browser for use by a virtual machine in a data processing system. The browser provides an interface in which the interface allows for selection of classes for use by the virtual machine. A selection of classes is received through the interface. The selection of classes is stored by the browser, wherein the selection of classes is used by the browser when initializing the virtual machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart of a process for starting a JVM using classpath values in accordance with a preferred embodiment of the present invention; and FIG. 9 is a diagram of a JVM initialization data structure in accordance with a preferred embodiment of the present invention.

DETAILED DESCRIPTION OF THE PREFERRED EMBODIMENT

Figure 1:
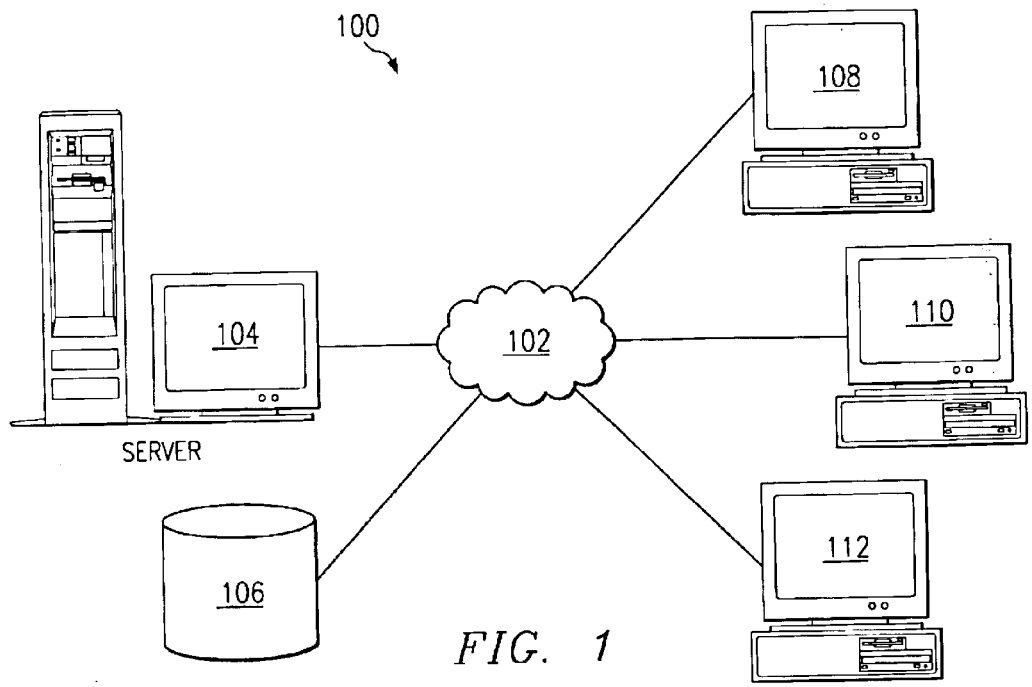
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as an umber of different types of networks, such as for example, an intranet or a local area network.

FIG. 1 is intended as an example, and not as an architectural limitation for the processes of the present invention.

Figure 2:
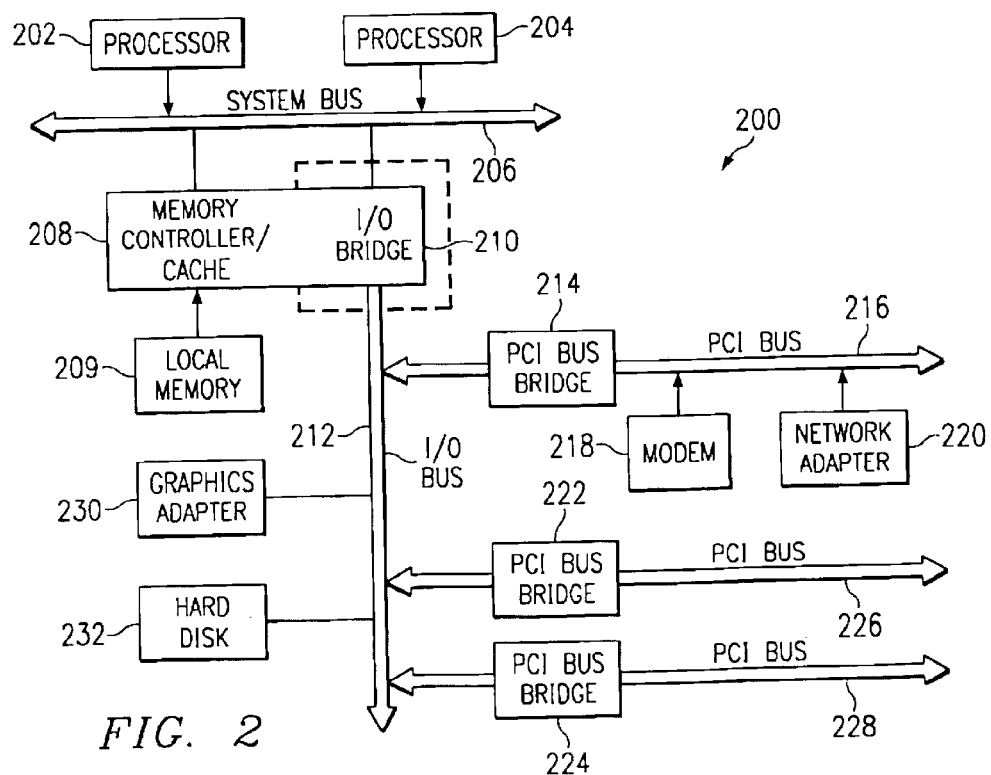
FIG. 2 is a block diagram of a data processing system which may be implemented as a server in accordance to the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
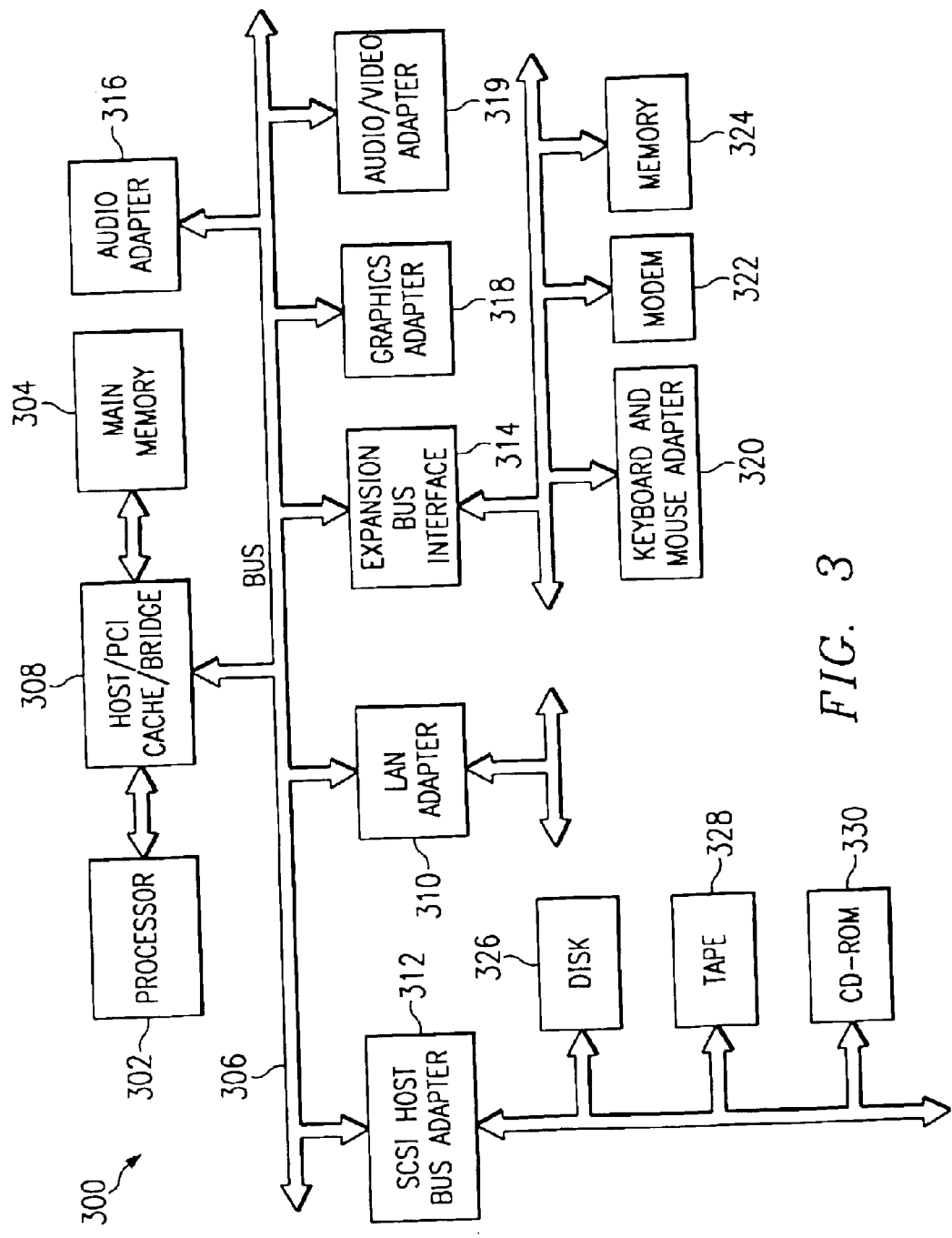
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 112 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 1. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

The present invention provides a method, apparatus, and instructions for selectively and dynamically loading classes. This mechanism also enables and enhances polymorphism in an otherwise static Java classpath name space. The present invention provides a mechanism for modifying or viewing the value of a class path for a JVM that is used with a browser. Currently available mechanisms for modifying the classpath variable for loading needed classes rely on the user modifying the system defined global class path manually or via a script executed prior to running the browser. The classpath variable is an environmental variable that defines a path to the "classes.zip" file, which is used to load classes for use by the JVM. The present invention provides a high level of integration, which provides users with maximum flexibility in setting the value for a classpath for individual and multiple user environments. Different user profiles may employ different classpaths such that switching of classpaths may be accomplished by selection of a user profile. A graphical user interface (GUI) is provided as part of the browser to allow a user to specify a classpath, also referred to as an "extended classpath". This extended classpath when set within the GUI provides the ability to assign a browser a localized instance per user profile of a classpath. In the depicted examples, a user may choose to append the extended classpath to the beginning or end of the system defined classpath or simply ignore the system defined classpath and only pass the extended classpath to JVM. By changing or appending classpaths, the classes loaded and used in the JVM may be changed. As used herein, the term "browser" refers to browsers in addition to hypertext markup language (HTML) browsers, such as Netscape Communicator for OS/2. In addition, a browser may encompass other applications that operate in a Java based network or other distributed network.

In the depicted examples, the processes and interfaces described are for a browser, such as Netscape Communicator operating in an OS/2 operating system. These examples are not intended to limit the invention to a particular browser or operating system. The processes and interfaces of the present invention may be applied to other types of browsers and operating systems.

Figure 4:
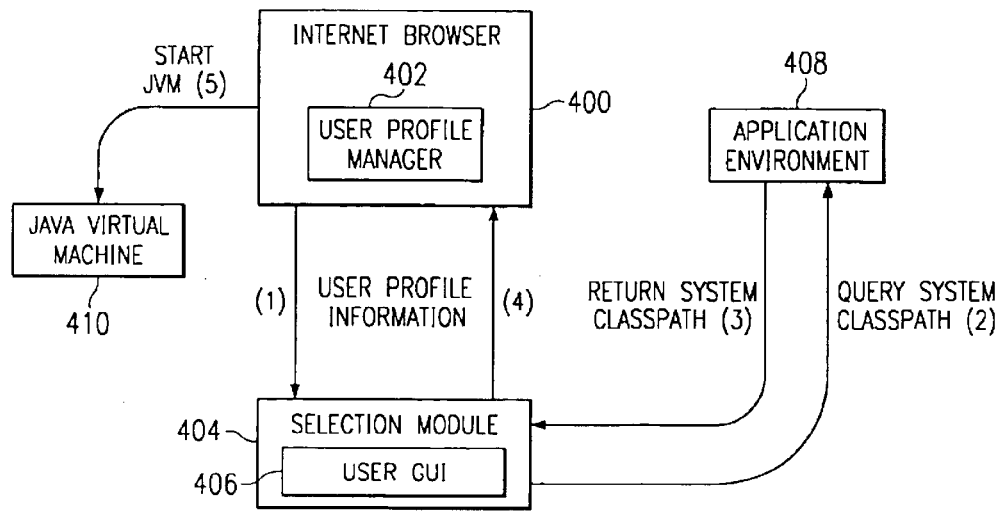
FIG. 4 is a diagram of components used to select classpath value in accordance with a preferred embodiment of the present invention.

With reference now to FIG. 4, a diagram of components used to select classpath value is depicted in accordance with a preferred embodiment of the present invention. Internet browser 400 contains a user profile manager 402, which is employed to manage one or more user profiles for internet browser 400. Internet browser 400 may be implemented using a browser, such as, for example, Netscape Communicator, which is available from Netscape Communications Corporation. Selection module 404 contains the processes used in providing a user an ability to select classpath values. Selection module 404 presents a GUI 406 to the user, which allows the user to select a value for the classpath that is to be employed for the user when a JVM is initialized in association with the browser. Selection module 404 queries user profile manager 402 within internet browser 400 for user profile information to display to a user in setting a classpath value. Selection module 404 queries application environment 408 for the system classpath. The application environment in the depicted examples is the value of environmental variables before starting the browser. In response, application environment 408 returns the system classpath to selection module 404. This information is displayed to the user through the GUI 406. Selections or changes in JVMs are received as user input through GUI 406. This user input is returned to user profile manager 402 when a JVM is to be started by internet browser 400, the user profile information with the classpath value is employed to start JVM 410.

Figure 5:
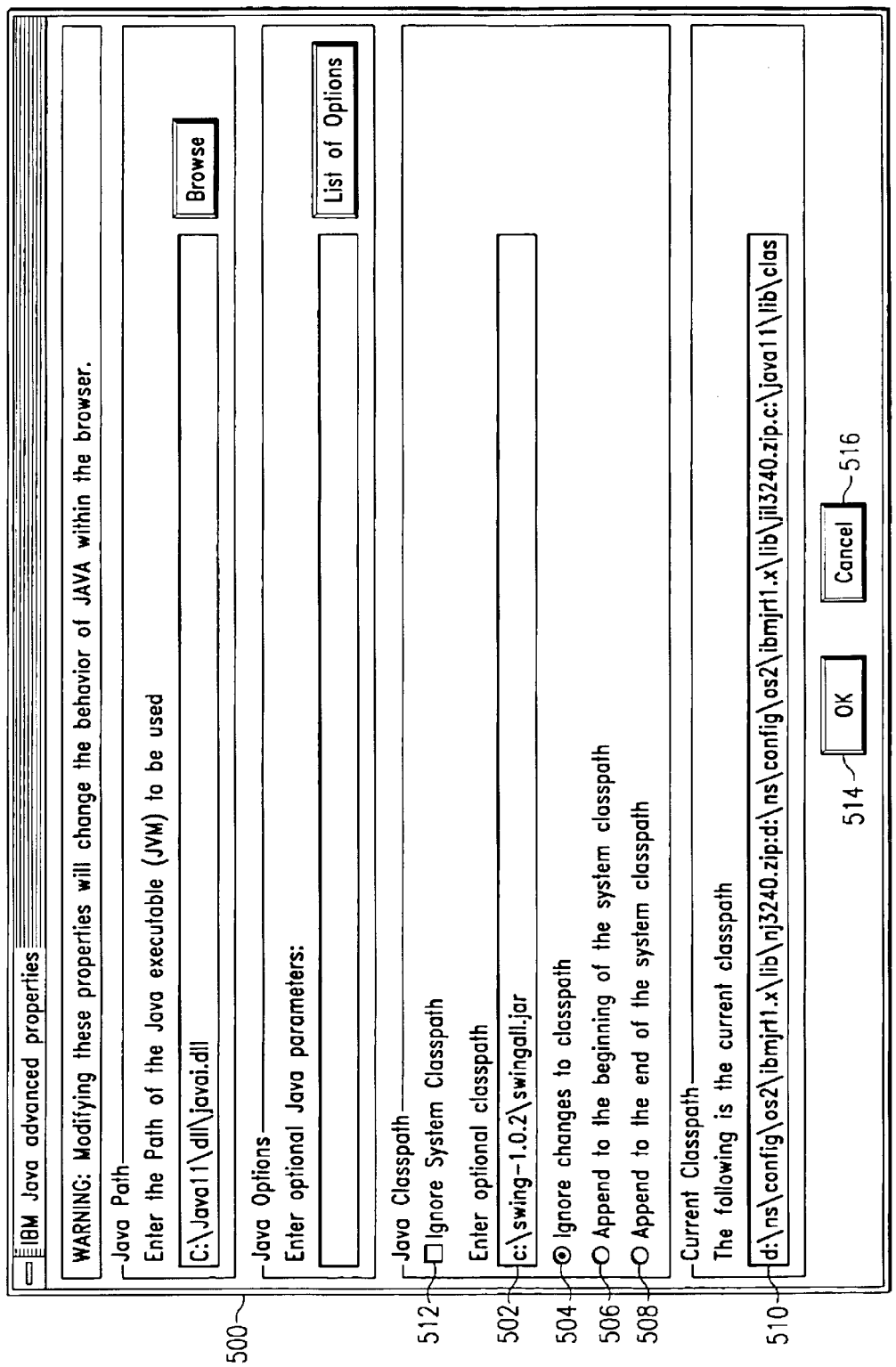
FIG. 5 is a graphical user interface used in modifying classpath values in accordance with a preferred embodiment of the present invention.

With reference next to FIG. 5, a graphical user interface used in modifying classpath values is depicted in accordance with a preferred embodiment of the present invention. Java advanced properties dialog 500 is displayed to a user to allow for modification of various options for using a JVM with a browser. Optional classpath field 502 is present in Java advanced properties dialog 500 to allow a user to enter a classpath. The user then may select a number of options 504, 506, and 508. Option 504 is selected if the user desires to ignore changes to the classpath. This option is the one selected in the depicted example. Option 506 is selected if a user desires to append the classpath to the beginning of the system classpath. Option 508 is selected if a user desires to append the classpath to the end of the system classpath. The current classpath is displayed to the user in current classpath field 510 in Java advanced properties dialog 500. By selecting option 512, a user may choose to ignore the system classpath and use only the classpath entered by the user. If the user is satisfied with the changes within Java advanced properties dialog 500, the user may select OK button 514. Cancel button 516 is selected if the user does not want to use options changed in Java advanced properties dialog 500.

Figure 6:
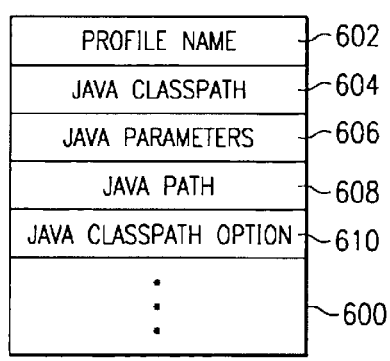
FIG. 6 is a diagram of a user profile data structure managed by a user profile manager in accordance with a preferred embodiment of the present invention.

With reference now to FIG. 6, a diagram of a user profile data structure managed by a user profile manager is depicted in accordance with a preferred embodiment of the present invention. User profile data structure 600 contains information used to configure behavior of the web browser for a particular user. In the depicted example, user profile data structure 600 includes a profile name 602, a Java class path 604, Java parameters 606, a Java path 608, and a Java class path option 610. Profile name 602 is used to uniquely identify the profile from other profiles when the browser contains multiple user profiles. Java class path 604 is used to identify the path in which classes are loaded for use by the JVM. Java parameters 606 contain parameters used by a JVM when the browser initializes or starts a JVM for use with the browser. These parameters may include, for example, initial heap size, garbage collection information, Java stack size, and reporting options for JVM information. Java path 608 includes the path and file name for the JVM that is to be used with the browser. Java class path option 610 provides information that may be used to depend an extended class path to the beginning or end of the system defined class path. User profile data structure 600 also includes other information (not shown) employed to define the behavior of the browser.

Figure 7:
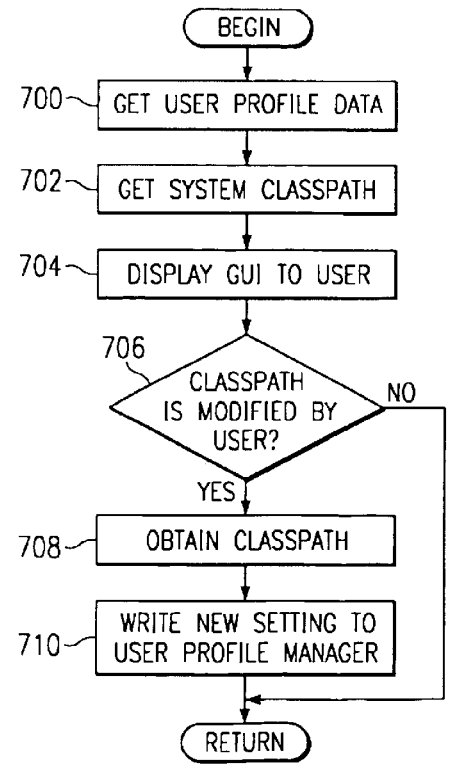
FIG. 7 is a high level flowchart of a process used to select a JVM for use with a web browser in accordance with a preferred embodiment of the present invention.

With reference now to FIG. 7, a high level flowchart of a process used to select a JVM for use with a web browser is depicted in accordance with a preferred embodiment of the present invention. The process begins by obtaining user profile data (step 700). This data is obtained from the user profile manager within the browser. Next, the system classpath is obtained from the application environment (step 702). The data is displayed to a user using a GUI (step 704). A determination is then made as to whether the classpath is to be changed (step 706). For example, this step may be used to change the value for the Java classpath that is used to load classes for use by the JVM, which is used with the browser. More specifically in the depicted example, an extended classpath may be appended to the beginning or end of the system classpath, or only the extended classpath may be passed to the JVM.

If the classpath is not to be changed, the process terminates. Otherwise, the new classpath is obtained (step 708). The new classpath is obtained through a GUI presented to the user in which the user may select the classpath for use by the JVM to be used with the browser. Thereafter, the new settings for the classpath are written or sent to the profile manager in the browser (step 710) with the process terminating thereafter. The classpath may be, for example, OS2.ibm.java.classpath.

Turning next to FIG. 8, a flowchart of a process for starting a JVM using classpath values is depicted in accordance with a preferred embodiment of the present invention. The process begins by checking the profile manager to determine whether the classpath "OS2.ibm.java.classpath" exists in the user profile data structure for a user profile (step 800). This classpath is the user defined classpath. Next, a determination is made as to whether the classpath is set in the profile manager (step 802). This determination is made by checking the user profile data structure for the selected user. If the user classpath is set in the profile manager, the process then initializes the JVM initialization arguments (Initargs) data structure to use the classpath in the user profile (step 804). Then, an instance of the virtual machine is created (step 806) with the process terminating thereafter.

With reference again to step 802, if the classpath is not set in the profile manager, a determination is then made as to whether the user wants to use the system class path (step 808). If the user does not want to use the system classpath, the process then proceeds to step 806 to create an instance of the JVM. The instance of the JVM is created by calling a Java native interface (JNI) application programming interface (API). A Java native interface is a native programming interface that allows Java code that runs inside a Java virtual machine to interoperate with applications and libraries written in other programming languages, such as C, C++ and assembly. In the depicted example, the JNI API provides an interface for native applications, such as a browser, to reach Java. The JNI is used to translate messages from other Java objects or components into calls used by the browser and to translate responses from the browser into messages that are recognized by Java objects or components. An example of a JNI API is JNI_CreateJavaVM. JNI are found in the Java Development Kit (JDK) available from Sun Microsystems, Inc. If the user does want to use the system classpath, the JVM is initialized from InitOrgs data structure to use the system classpath name (step 810) with the process terminating thereafter. Depending on the implementation, the user may actually be an application that uses the processes of the present invention to select or change classpaths. In such an implementation, the GUI interfaces may be bypassed with the selections being made directly by the application to the user profile data structure.

Turning next to FIG. 9, a diagram of a JVM initialization data structure is depicted in accordance with a preferred embodiment of the present invention. JVM initialization data structure 900 illustrates various parameters that are used as a JNI API to initialize a JVM.

Thus, the present invention provides an improved method, apparatus, and instructions for allowing flexibility in selecting classpaths used to load classes for a JVM. For example, the present invention is useful in placing improved classes ahead of standard classes having the same name such that these improved classes are given preference in loading for use with the JVM. In particular, the present invention provides a GUI that allows a user to specify classpaths for use with a JVM when the JVM is initiated by the browser. When switching to a different JVM, the classpaths also may be switched to optimize performance of the JVM.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, the processes of the present invention may be applied to change classpaths dynamically or at run time. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for selecting classes using a browser for use by a virtual machine in a data processing system, the method comprising:

providing through the browser, an interface in which the interface allows for selection of classes for use by the virtual machine;

receiving a selection of classes through the interface;

storing the selection of classes, wherein the selection of classes is used by the browser when initializing the virtual machine; and using the selection of the classes to initialize the virtual machine.

2. The method of claim 1, wherein the interface is a graphical user interface.

3. The method of claim 1, wherein the virtual machine is a Java virtual machine.

4. The method of claim 1, wherein the step of storing the selection of classes comprises storing the selection of classes in a user profile.

5. The method of claim 1, wherein the selection of classes is a class path.

6. The method of claim 1, wherein the selection of classes causes a class path to be appended to a system class path.

7. A method for selecting classes for use by a Java virtual machine associated with a browser, the method comprising:

displaying a graphical user interface in which a classpath may be selected to define classes for use with the Java virtual machine;

receiving a selection of the classpath from the graphical user interface;

storing the selection of the classpath; and initializing the Java virtual machine using the selection of the class path.

8. The method of claim 7, wherein the selection of the classpath appends the classpath to a system classpath.

9. The method of claim 8, wherein the system class path has an end and wherein the classpath is appended to the end of the system classpath.

10. The method of claim 8, wherein the system classpath has a beginning and wherein the classpath is appended to a beginning of the system classpath.

11. A data processing system for selecting classes using a browser for use by a virtual machine in the data processing system, the data processing system comprising:

providing means for providing through the browser an interface in which the interface allows for selection of classes for use by the virtual machine;

receiving means for receiving a selection of classes through the interface;

storing means for storing the selection of classes, wherein the selection of classes is used by the browser when initializing the virtual machine; and means for using the selection of the classes to initialize the virtual machine.

12. The data processing system of claim 11, wherein the interface is a graphical user interface.

13. The data processing system of claim 11, wherein the virtual machine is a Java virtual machine.

14. The data processing system of claim 11, wherein the step of storing the election of classes comprises storing the selection of classes in a user profile.

15. The data processing system of claim 11, wherein the selection of classes is a classpath.

16. The data processing system of claim 11, wherein the selection of classes causes a classpath to be appended to a system class path.

17. A computer program product in a computer readable medium for selecting classes for use by a Java virtual machine associated with a browser, the computer program product comprising:

first instructions for displaying a graphical user interface in which a classpath may be selected to define classes for use with the Java virtual machine;

second instructions for receiving a selection of the classpath from the graphical user interface;

third instructions for storing the selection of the classpath; and fourth instructions for initializing the Java virtual machine using the selection of the classpath.

18. A method for selecting a class for use by a virtual machine in a data processing system, the method comprising:

providing through a browser, an interface in which the interface allows for selection of a class location for use by the virtual machine;

receiving a selection of a class location through the interface;

storing the class location, wherein the class location is used by the browser to load a class when initializing the virtual machine; and using the selection of the class to initialize the virtual machine.

19. The method of claim 18, wherein the class location is a class path.

20. The method of claim 18, wherein the class location is stored in a user profile data structure.

* * * * *

UNITED STATES PATENT AND TRADEMARK OFFICE
CERTIFICATE OF CORRECTION

PATENT NO. : 6,842,897 B1  Page 1 of 1
DATED : January 11, 2005
INVENTOR(S) : Beadle et al.

It is certified that error appears in the above-identified patent and that said Letters Patent is hereby corrected as shown below:

Column 10,
Line 13, delete "election" and insert -- selection --.

Signed and Sealed this

Eleventh Day of April, 2006

JON W. DUDAS
*Director of the United States Patent and Trademark Office*